United States Patent
Kanematsu

(10) Patent No.: US 8,294,921 B2
(45) Date of Patent: Oct. 23, 2012

(54) IMAGE OUTPUTTING APPARATUS, AND ARCHIVE SYSTEM INCLUDING THAT IMAGE OUTPUTTING APPARATUS AND ITS CONTROL METHOD

(75) Inventor: Shinichi Kanematsu, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/151,453

(22) Filed: Jun. 2, 2011

(65) Prior Publication Data

US 2011/0228339 A1 Sep. 22, 2011

Related U.S. Application Data

(63) Continuation of application No. 11/393,913, filed on Mar. 31, 2006.

(30) Foreign Application Priority Data

Apr. 5, 2005 (JP) ................................. 2005-109220

(51) Int. Cl.
*G06K 15/00* (2006.01)
*G06F 3/12* (2006.01)

(52) U.S. Cl. ...... 358/1.14; 358/1.1; 358/1.13; 358/1.15; 358/1.16; 358/1.18

(58) Field of Classification Search ......... 358/1.11–1.18
See application file for complete search history.

(56) References Cited

U.S. PATENT DOCUMENTS

| | | | |
|---|---|---|---|
| 6,535,298 B2 | 3/2003 | Winter et al. | |
| 6,545,767 B1 * | 4/2003 | Kuroyanagi | ................. 358/1.14 |
| 6,863,456 B1 * | 3/2005 | Kato | .............. 400/76 |
| 6,950,203 B1 * | 9/2005 | Akabane et al. | ............. 358/1.15 |
| 6,956,671 B2 | 10/2005 | Monty et al. | |
| 7,170,629 B2 * | 1/2007 | Hull et al. | ................... 358/1.15 |
| 7,225,331 B1 | 5/2007 | McBrearty et al. | |
| 7,295,337 B2 * | 11/2007 | Eguchi et al. | ................ 358/1.15 |
| 7,405,841 B2 * | 7/2008 | Takenouchi | ................ 358/1.18 |
| 7,532,335 B2 * | 5/2009 | Matsunaga et al. | .......... 358/1.13 |
| 7,532,337 B2 | 5/2009 | Hirabayashi | |
| 7,684,068 B2 * | 3/2010 | Hull et al. | ................... 358/1.15 |
| 7,701,601 B2 | 4/2010 | Shozaki et al. | |
| 2002/0145748 A1 * | 10/2002 | Nonoyama et al. | ......... 358/1.14 |
| 2003/0234948 A1 | 12/2003 | Sasaki | |
| 2004/0032614 A1 * | 2/2004 | Tanaka et al. | ............... 358/1.15 |
| 2006/0232594 A1 | 10/2006 | Kanematsu | |

FOREIGN PATENT DOCUMENTS

| | | |
|---|---|---|
| JP | 7-212602 | 8/1995 |
| JP | 2001-045275 | 2/2001 |

\* cited by examiner

*Primary Examiner* — Satwant Singh

(74) *Attorney, Agent, or Firm* — Fitzpatrick, Cella, Harper & Scinto

(57) ABSTRACT

When data is output from an archive-function incompatible driver to an archive-function incompatible device, that data is omitted from those to be archived. To this end, an image outputting apparatus of this invention determines whether or not received data has already been archived. When it is determined that the received data has already been archived, an image is outputted based on that received data. When it is determined that the received data has not been archived yet, image outputting of the received data is inhibited. Furthermore, the image outputting apparatus instructs a PC that transmitted the data to install an archive-function compatible driver.

14 Claims, 17 Drawing Sheets

F I G. 3
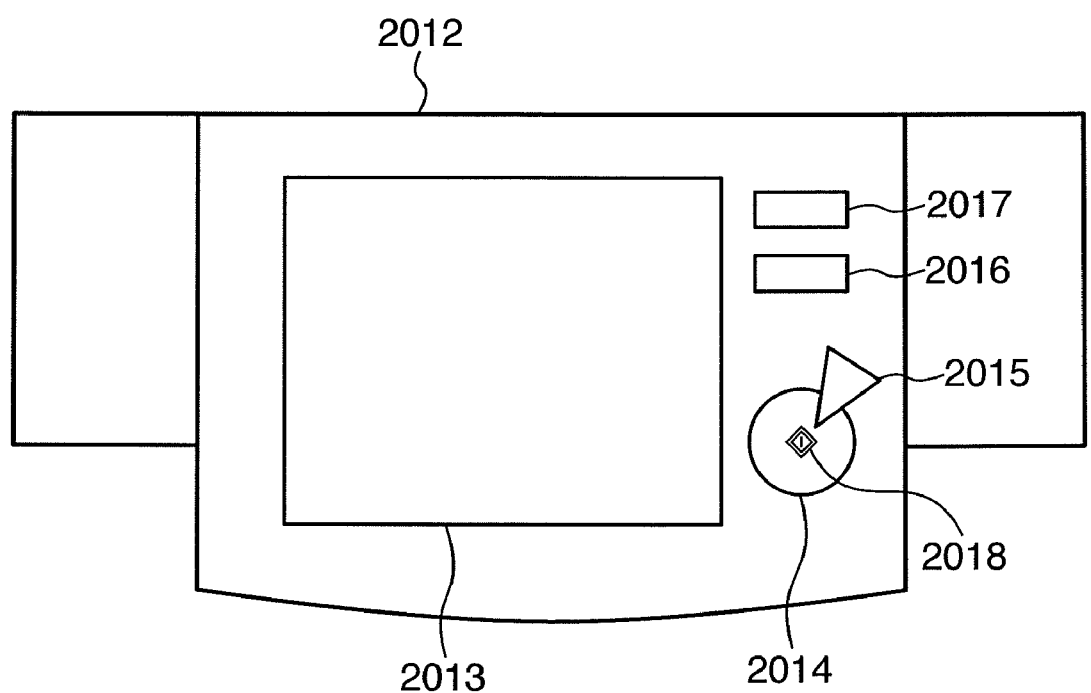

FIG. 13

MESSAGE FROM PRINTER DEVICE 1030

PRINTING IS CANCELED SINCE NON-RECOMMENDED DRIVER IS USED. DOWNLOAD AND INSTALL RECOMMENDED DRIVER FROM URL BELOW.

(NOTE) PRINTING USING PRINTER DEVICE 1030 IS INHIBITED UNLESS RECOMMENDED DRIVER IS USED.

http://www.abc.jp/driver/lbp/archive/lbp 100/v340

FIG. 15

MESSAGE FROM MFP 1010

USE OF NON-RECOMMENDED DRIVER IS DETECTED.
DOWNLOAD AND INSTALL DRIVER FROM URL BELOW.

http://www.abc.jp/driver/iR/archive/lips8
/v1020

IMAGE OUTPUTTING APPARATUS, AND ARCHIVE SYSTEM INCLUDING THAT IMAGE OUTPUTTING APPARATUS AND ITS CONTROL METHOD

This application is a continuation of U.S. patent application Ser. No. 11/393,913, filed Mar. 31, 2006, and allowed Mar. 2, 2011.

FIELD OF THE INVENTION

The present invention relates to an image outputting apparatus which receives data from an external device, and forms an image. The present invention also relates to an archive system in which an image outputting apparatus, at least one information processing apparatus, and an archive server are connected via a network, and its control method.

BACKGROUND OF THE INVENTION

In recent years, the need to prevent needs for preventing leakage of information, and to detect for a function of detecting leakage and trace tracing a leakage route when such leakage of information has occurred, is are increasing. This need arises Such needs arise from the fact that leakage of confidential information never seems to end. As for ways of information leakage, one brings a user can carry out paper documents which are physically copied or printed out, or can carry brings them out as digital data in many cases. In the companies, public offices, and the like which handle confidential information, security is enhanced to give top priority to avoiding avoidance of information leakage. However, such information leakage is often done by insiders. Furthermore, the information processing techniques technique and network technique techniques are progressing remarkably showing remarkable progresses, and the security techniques that are technique which is secure at the present time may even become obsolete soon.

Furthermore, office devices such as digital copying machines in recent years or the like, or a printer, scanner, and FAX (facsimile) device, have a function of digitizing paper documents and a print-out function of printing digitized documents. Also, they have a simulcast function to a host and devices connected via a network. These functions have advantages for the user of removing the boundary between paper documents and digital data and of providing to provide advanced functions and convenience that exploit the network function. However, transmission errors of large-sized data may occur due to a user's simple mistake, and it is even more dangerous if such functions are exploited maliciously. If information leakage of some kind is confirmed, it is indispensable to specify the outflow source or route of that information, and to take preventive measures.

In a case where information leakage has occurred, means for tracing and specifying a leakage route/source of that information (this function will be referred to as an archive function hereinafter) is required. The same applies to not only the leakage source and outflow route of physical paper documents but also those of document data and the like which are digitized by being scanned by a scanner. Tracing means for documents which are converted to digital data and can be easily transmitted via a network or public line is more strongly demanded. For this purpose, office apparatuses such as a copying machine, printer, and the like, as input/output devices of paper documents and digital data, are required to have document tracing capability that can achieve the above object. By familiarizing the public with the fact that the copying machine, printer, scanner, and FAX monitor all documents to be input and output, a suppression effect against information outflow and easy copying copy and transmission by domestic users is also expected.

As a prior art for implementing this such archive and document tracing capability, Japanese Patent Laid-Open Nos. 7-212602 and 2001-45275 are known. According to these references, all printed data are stored in a storage device in a device while appending information to the data about of users who printed them out to these the data. When outflow of document data has occurred, stored information is searched based on an image of the that document corresponding to the document data, or additional information, so as to specify the output user and relay the route of the document data that has flowed out. In such a device, when the storage device that archives data is full of data, new operations are inhibited until a server extracts archive data from the storage device, so as to prevent any archive omission. Furthermore, in order to capture output data that is output to a device which itself has no function of archiving data to be output by itself, an arrangement is realized in which data is transmitted in advance from a host to an archive server which archives the that data, and then the data is transmitted from the host to the output that device upon transmitting data from a driver on the host to the device, is also realized. The driver on the host has a such function of transmitting data from the host to the archive server. Especially, as for data printed or transmitted via FAX from a personal computer, by introducing a driver which is compatible with to such archive function, all images can be archived even in a user environment that includes a printer and FAX which have no archive function.

However, in an environment in which devices with and without the archive function, or drivers with and without the archive functions, are present together, the following problems occur.

If data is output from an archive-function incompatible driver to an archive-function incompatible device, that data is omitted from those to be archived. A method of inhibiting drivers other than the archive-function compatible drivers from being used, and avoiding such omission by management, may be used. However, when a malicious user installs an incompatible driver or brings in a personal computer to print data, such print data is not stored in the archive server, thus forming a loophole in terms of the archive function.

When an archive-function compatible driver outputs data to an archive-function compatible device, both the driver and device archive that data. Hence, both the driver and device unnecessarily hold identical data. Especially, on the device side, the data storage capacity that can hold data is more strictly limited, and when an archive storage area becomes full of data, that device cannot operate until the archive server collects data. Such waste increases the down time of the device.

Furthermore, a case will be examined below wherein the user who wants to use a printer, FAX, or the like from an information processing apparatus such as a PC (personal computer) or the like, in which no archive-function compatible driver is installed, transmits data to a device which has no archive function. In such a case, since the device side determines that data is transmitted from an archive-function incompatible driver, it cannot accept a print or FAX job. In this case, a bona fide user cannot determine how to use a print or FAX function if there is no means to know why that user cannot print or transmit data even if he or she wants to execute it.

Furthermore, upon reception of a print or FAX transmission instruction from an archive-function incompatible driver, a device having an archive function itself archives that data. After that, the device outputs the archived data to the archive server, thus providing the archive function to the user. However, when the archive-function compatible driver is used, since the archive storage area of the device can be used more effectively, it is not efficient for the user to keep using an archive-function incompatible driver.

SUMMARY OF THE INVENTION

It is an object of the present invention to solve the conventional problems.

It is a feature of the present invention to provide an image outputting apparatus and an archive system and its control method, which can prevent user's convenience from being compromised.

The feature can be achieved by combining features described in independent claims, and dependent claims merely specify effective practical examples of the invention.

An image outputting apparatus according to one aspect of the present invention comprises the following arrangement. That is, an image outputting apparatus for outputting an image based on data received from an external device, comprising:

a determination unit configured to determine whether or not the received data has already been archived by an external apparatus; and a control unit configured to control to output an image based on the received data when the determination unit determines that the received data has already been archived, and to inhibit image outputting of the received data when the determination unit determines that the received data has not been archived yet.

An archive system according to one aspect of the present invention comprises the following arrangement. That is, an archive system in which at least one information processing apparatus, an image outputting apparatus, and an archive server are connected via a network, comprising:

a unit configured to control the information processing apparatus to transfer job data to the archive server to archive the job data;

a unit configured to control the information processing apparatus to transmit the job data, which is appended with information indicating that the job data has already been archived, to the image outputting apparatus; and a unit configured to control the image outputting apparatus, which received the job data including the information indicating that the job data has already been archived, to execute image outputting operation based on the job data without archiving the job data by the archive server.

A method of controlling an image outputting apparatus according to one aspect of the present invention comprises the following steps. That is, a method of controlling an image outputting apparatus for outputting an image based on data received from an external device, comprising:

a determination step of determining whether or not the received data has already been archived; and a control step of controlling to output an image based on the received data when it is determined in the determination step that the received data has already been archived, and to inhibit image outputting of the received data when it is determined in the determination step that the received data has not been archived yet.

A method of controlling an archive system according to one aspect of the present invention comprises the following steps. That is, a method of controlling an archive system in which at least one information processing apparatus, an image outputting apparatus, and an archive server are connected via a network, comprising:

a step of controlling the information processing apparatus to transfer job data to the archive server to archive the job data;

a step of controlling the information processing apparatus to transmit the job data, which is appended with information indicating that the job data has already been archived, to the image outputting apparatus; and a step of controlling the image outputting apparatus, which received the job data including the information indicating that the job data has already been archived, to execute image outputting operation based on the job data without archiving the job data by the archive server.

Note that the summary of the invention does not list all necessary features, and a sub-combination of these features can form the invention.

According to the present invention, the security of an archive system can be improved by preventing archive omission, and an extra archive can also be prevented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a schematic view of a console of the MFP according to the embodiment of the present invention;

FIG. 13 shows an example of a message from a printer which is displayed on a display unit of the PC according to the embodiment of the present invention;

FIG. 15 shows an example of a message from the MFP which is displayed on the display unit of the PC according to the embodiment of the present invention;

DETAILED DESCRIPTION OF THE PREFERRED EMBODIMENTS

Preferred embodiments of the present invention will now be described in detail in accordance with the accompanying drawings.

Figure 1:
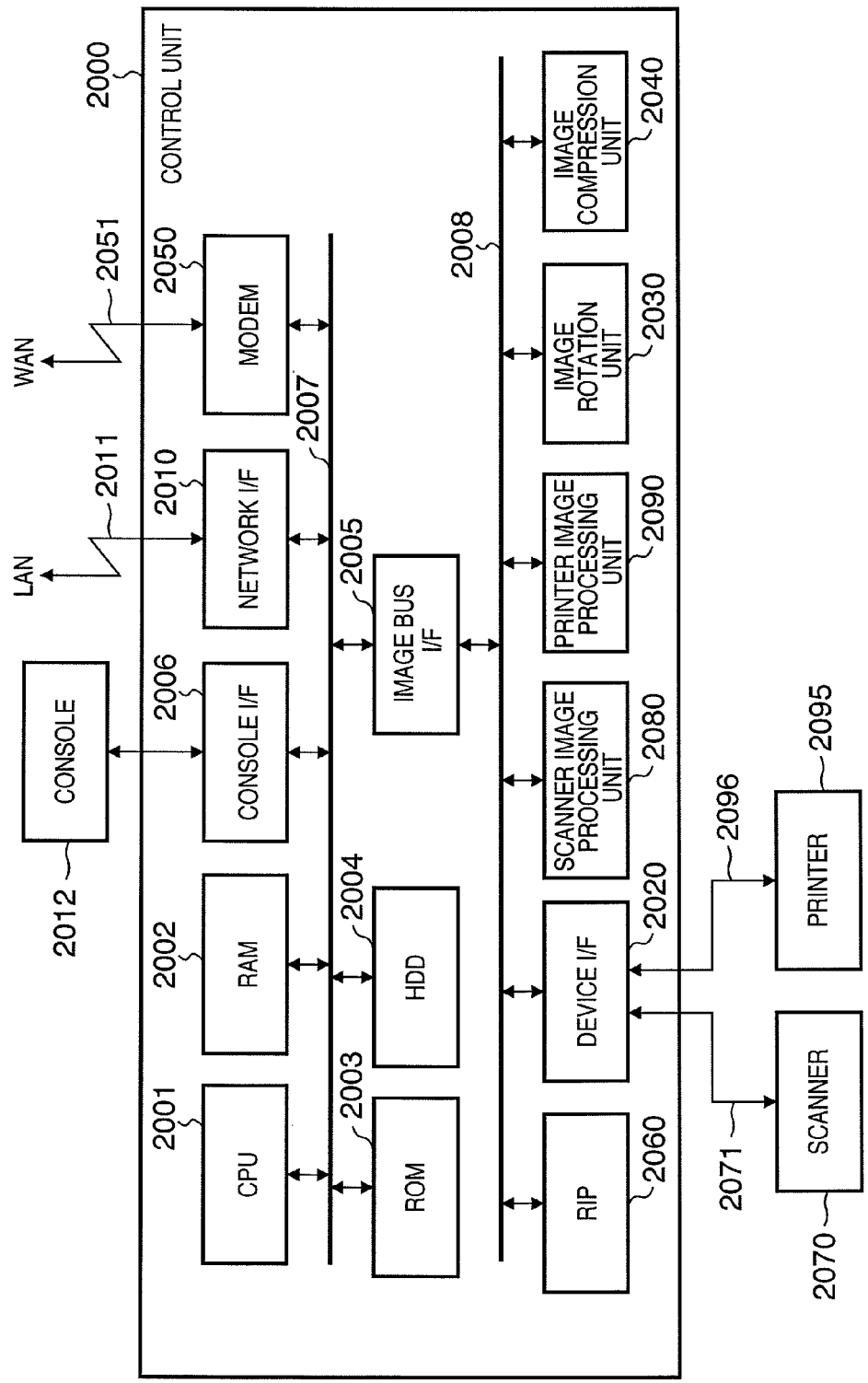
FIG. 1 is a block diagram showing the overall arrangement of an archive-function compatible image outputting apparatus (multi-functional peripheral (MFP)) according to an embodiment of the present invention.

FIG. 1 is a block diagram showing the overall arrangement of an archive-function compatible image outputting apparatus (multi-functional peripheral (MFP) in this case) as image outputting apparatus according to an embodiment of the present invention.

A control unit 2000 is connected to a scanner 2070 as an image input device and a printer 2095 as an image output device via cables 2071 and 2096. Also, the control unit 2000 is connected to a LAN 2011 and a public line (WAN) 2051, and inputs and outputs image information and device information via these devices and networks. A CPU 2001 controls processing of this control unit 2000 in accordance with programs stored in a RAM 2002. The RAM 2002 provides a work area used to temporarily save various data when the CPU 2001 executes processing, and also an image memory used to temporarily store image data. A ROM 2003 is a boot ROM and stores a boot program of the system. An HDD 2004 is a hard disk drive which stores various programs and data such as the OS of the system, various application programs, image data, and the like. Each program stored in the HDD 2004 is loaded onto the RAM 2002 and is executed by the CPU 2001 when it is executed. The HDD 2004 archives and stores image data scanned by the scanner 2070 from documents and print/transmission data which are transmitted from an archive-function incompatible driver, so as to copy, transmit via FAX, and store documents.

A console I/F 2006 is an interface with a console (UI) 2012, and outputs image data to be displayed on the console 2012 to it. Also, the console I/F 2006 serves to send various kinds of information input by the user using the console 2012 to the CPU 2001. A network I/F 2010 is connected to the LAN 2011 to exchange information with the network, and makes data communications with an archive server, client/host, driver distribution server, and the like on the network. A modem 2050 is connected to the public line 2051 to exchange information. The aforementioned devices are connected to a system bus 2007.

An image bus I/F 2005 is a bus bridge which is interposed between an image bus 2008 that transfers image data at high speed and the system bus 2007 to convert a data structure. The image bus 2008 comprises, e.g., a PCI bus or IEEE1394. The following devices are connected to this image bus 2008.

A raster image processing unit (RIP) 2060 rasterizes PDL (page description language) code data into a bitmap image. A device I/F unit 2020 connects the scanner 2070 and printer 2095 as the image input and output devices to the control unit 2000 to convert image data between a synchronous system and an asynchronous system. A scanner image processing unit 2080 corrects, modifies, and edits image data input from the scanner 2070. A printer image processing unit 2090 applies correction, resolution conversion, and the like to image data to be printed, which is output to the printer 2095. An image rotation unit 2030 rotates image data. An image compression unit (CODEC) 2040 executes compression/decompression processing of multi-valued image data by JPEG and that of binary image data by JBIG, MMR, or MH.

Figure 2:
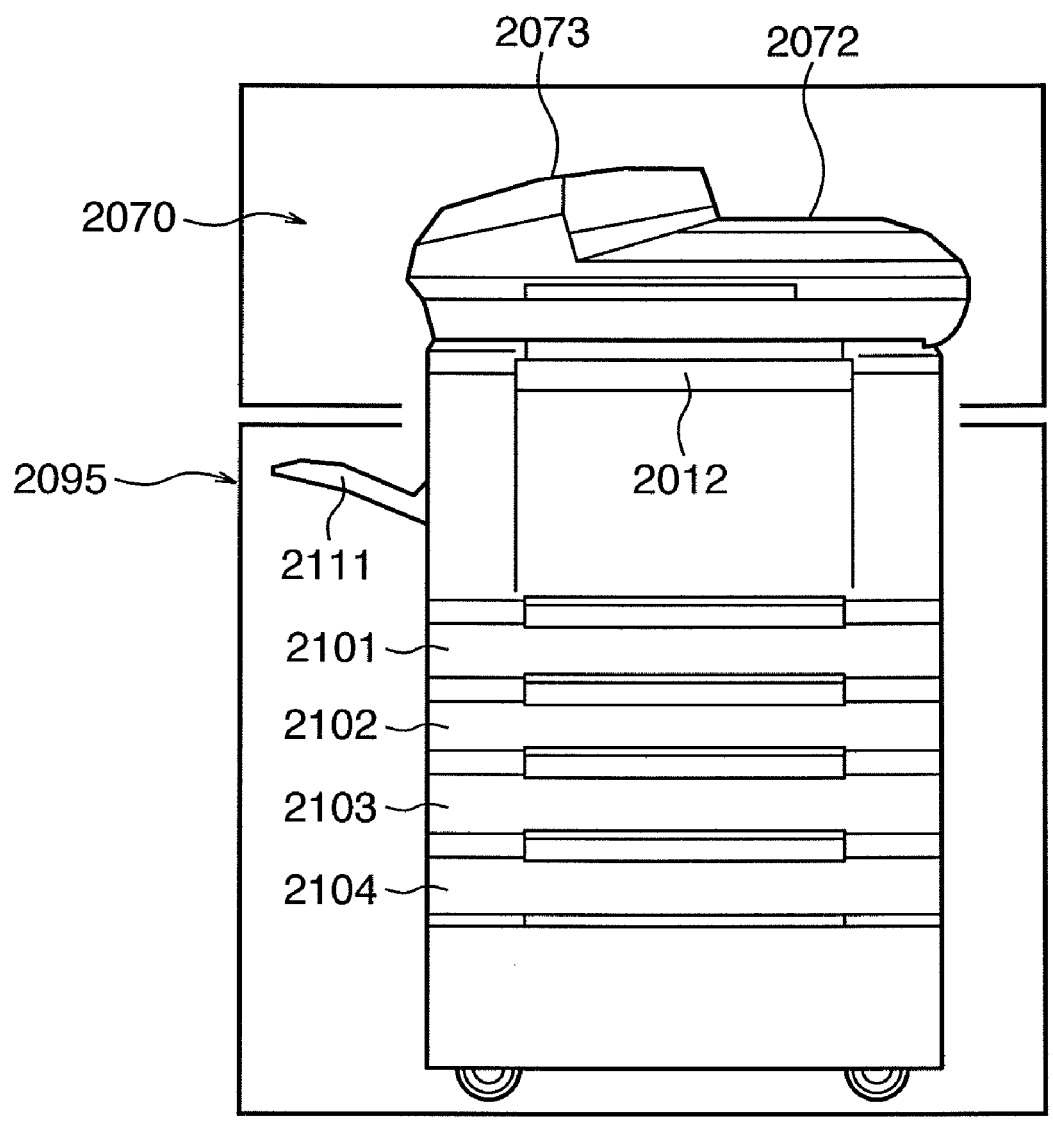
FIG. 2 is a side view showing the outer appearance of the archive-function compatible MFP according to the embodiment of the present invention.

FIG. 2 is a side view showing the outer appearance of the archive-function compatible MFP according to this embodiment. This MFP comprises the scanner 2070 and printer 2095 shown in FIG. 1, and has functions of a copying machine, facsimile device, printer, and the like.

The scanner 2070 converts an image on a sheet as a document into an electrical signal as raster image data by illuminating that image with light and scanning a CCD line sensor (not shown). The user sets documents on a tray 2023 of a document feeder 2072, and inputs a scan start instruction from the console 2012. In response to instruction, the CPU 2001 sends an instruction to the scanner 2070, and the feeder 2072 feeds document sheets one by one, thus scanning document images.

The printer 2095 receives raster image data output from the device I/F 2020 and prints it on a print medium such as a print sheet and the like. As print methods of this printer 2095, an electrophotographic method using a photosensitive drum, photosensitive belt, or the like, an ink-jet method that directly prints an image on a paper sheet by ejecting ink from a micro-nozzle array, and the like may be used. The print method is not particularly limited. The print operation of the printer 2095 is activated in response to an instruction from the CPU 2001. This printer 2095 has a plurality of paper feed stages to allow the user to select different paper sizes or different paper orientations, and has paper cassettes 2101 to 2104 corresponding to these stages. An exhaust tray 2111 receives and stores exhausted printed paper sheets.

FIG. 3 is a schematic view of the console 2012 of the MFP according to this embodiment.

An LCD display unit 2013 is prepared by adhering a touch panel sheet on an LCD, and displays an operation window here. When any of keys displayed on the LCD display unit 2013 is pressed, the LCD display unit 2013 sends its position information to the CPU 2001. A start key 2014 is used, e.g., when the scan operation of a document image is to be started. The start key 2014 has two-color, i.e., green and red LEDs 2018 at its central portion, and indicates based on the color of the ON LED if the start key 2014 is ready to use. A stop key 2015 is used to stop an active operation. An ID key 2016 is used when the user inputs a user ID. A reset key 2017 is used to reset settings from the console 2012.

Figure 4:
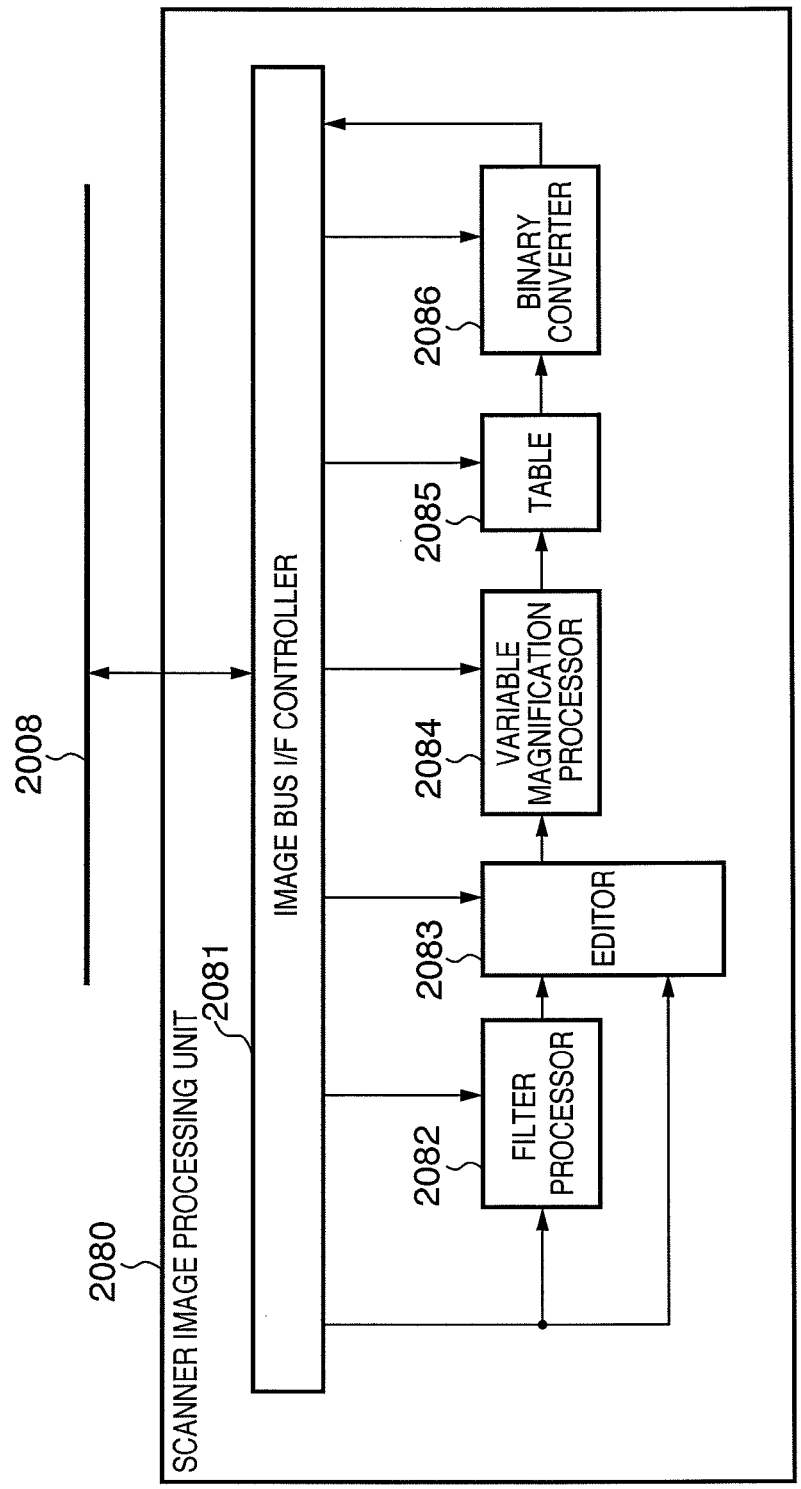
FIG. 4 is a block diagram for explaining the functional arrangement of a scanner image processing unit of the MFP according to the embodiment of the present invention.

FIG. 4 is a block diagram for explaining the functional arrangement of the scanner image processing unit 2080 of the MFP according to this embodiment.

An image bus I/F controller 2081 is connected to the image bus 2008 to control its bus access sequence, and to control devices of the scanner image processing unit 2080 and generate timings for these devices. A filter processor 2082 makes convolution operations using a spatial filter. An editor 2083 recognizes a closed region bounded by a marker pen from, e.g., input image data, and applies image modification processing such as shadow casting, hatching, negative-positive reversal, and the like to image data in that closed region. A variable magnification processor 2084 performs interpolation operations in the main scan direction of a raster image to enlarge or reduce that image when the resolution of a scanned image is to be changed. Variable magnification processing in the sub-scan direction is attained by changing the scan speed of the image scan line sensor (not shown). A table 2085 is referred to when image data as scanned luminance data is to be converted into density data. A binary converter 2086 binarizes multi-valued grayscale image data by error diffusion or screening. Image data that has undergone the processing is transferred onto the image bus 2008 via the image bus I/F controller 2081 again.

Figure 5:
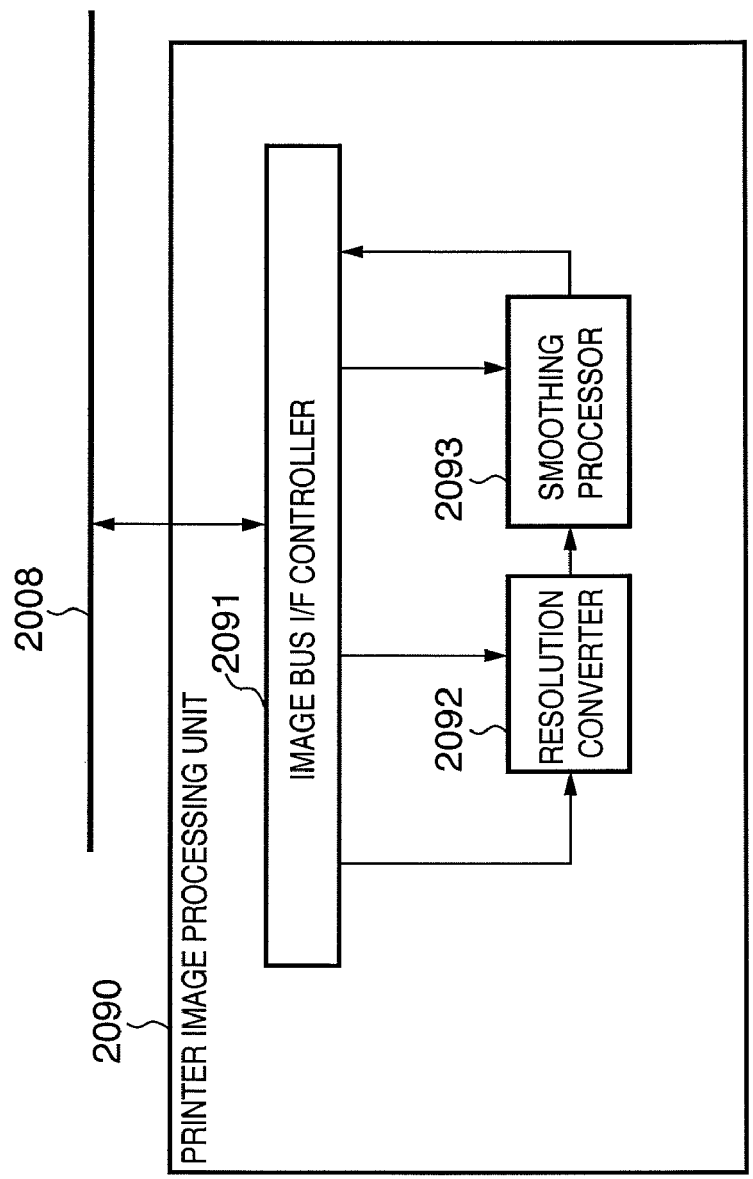
FIG. 5 is a block diagram for explaining the functional arrangement of a printer image processing unit of the MFP according to the embodiment of the present invention.

FIG. 5 is a block diagram for explaining the functional arrangement of the printer image processing unit 2090 of the MFP according to this embodiment.

An image bus I/F controller 2091 is connected to the image bus 2008 to control its bus access sequence, and to control devices of the printer image processing unit 2090 and generate timings for these devices. A resolution converter 2092 performs resolution conversion for converting image data received from the network I/F 2010 or the public line 2051 into the resolution of the printer 2095. A smoothing processor 2093 executes processing for smoothing jaggy (noise of an image such as oblique lines or the like, which appear on a boundary portion between black and white) of image data after resolution conversion.

Figure 6:
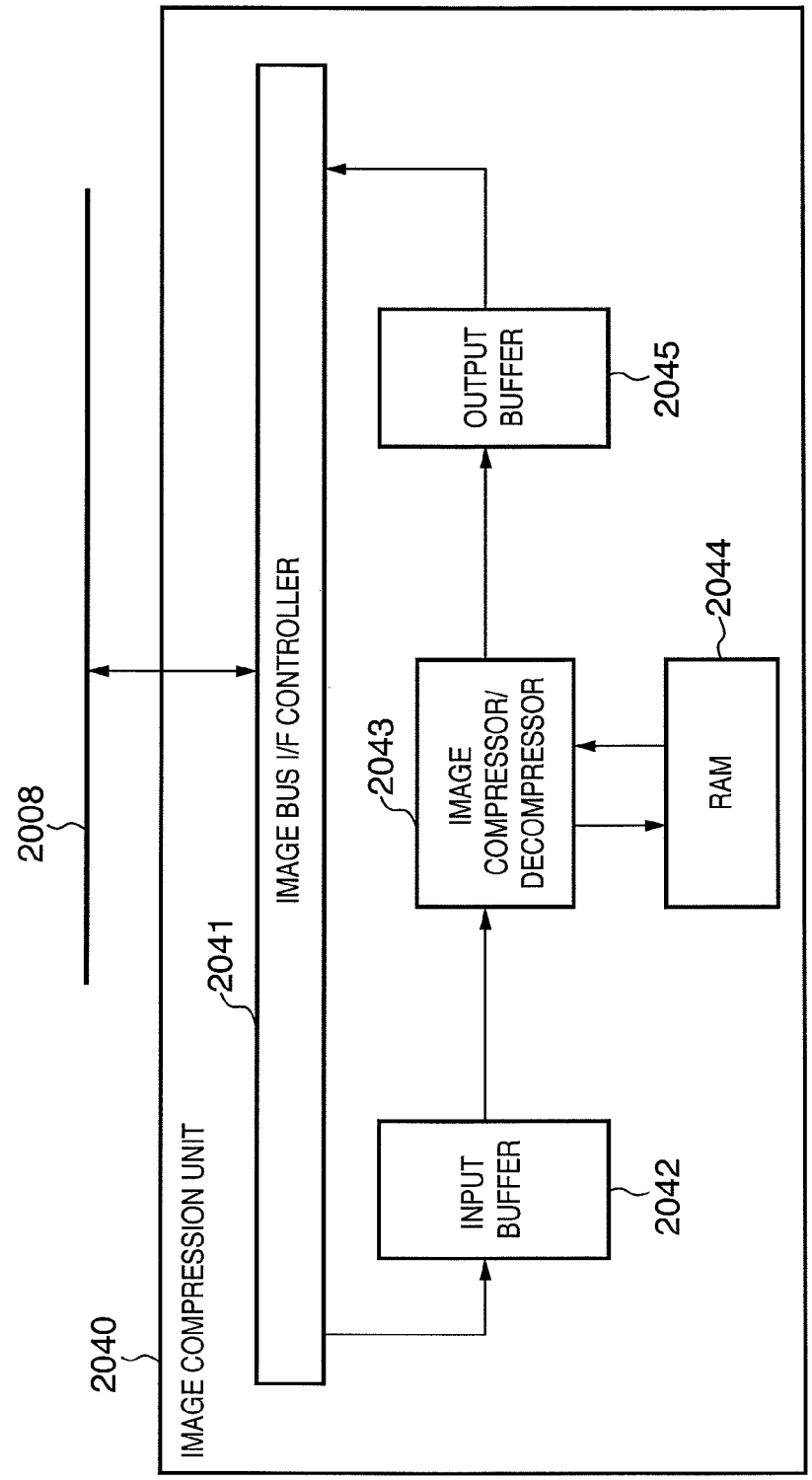
FIG. 6 is a block diagram for explaining the functional arrangement of an image compression unit of the MFP according to the embodiment of the present invention.

FIG. 6 is a block diagram for explaining the functional arrangement of the image compression unit 2040 of the MFP according to this embodiment.

An image bus I/F controller 2041 is connected to the image bus 2008 to control its bus access sequence. More specifically, the image bus I/F controller 2041 performs control such as timing control to exchange data with an input buffer 2042 and output buffer 2045, mode settings for an image compression/expansion unit 2043, and the like. The processing sequence of the image compression unit 2040 will be described below.

The CPU 2001 makes a setting for image compression control in the image bus I/F controller 2041 via the image bus 2008. Based on this setting, the image bus I/F controller 2041 makes a setting (of, e.g., MMR or JBIG compression/decompression, etc.) required to compress/decompress image data in the image compressor/decompressor 2042. After the required setting is made, the CPU 2001 issues an image data transfer permission to the image bus I/F controller 2041 again. With this permission, the image bus I/F controller 2041 begins to receive image data from the RAM 2002 or respective devices on the image bus 2008. The image data received in this way is temporarily stored in the input buffer 2042 and is transferred to the image compressor/decompressor 2043 at a constant speed in response to an image data request from the image compressor/decompressor 2043. In this case, the input buffer 2042 checks if image data can be transferred between the image bus I/F controller 2041 and image compressor/decompressor 2043. If it is impossible to read image data from the image bus 2008 and to write an image in the image compressor/decompressor 2043, the input buffer 2042 makes control not to transfer data (such control will be referred to as handshake hereinafter). The image compressor/decompressor 2043 temporarily stores the received image data in a RAM 2044. This is because compression/decompression of image data requires data for several lines depending on the types of image compression/decompression processing, and compression/decompression can be started only after image data for several lines are prepared so as to compress/decompress data for the first line. The compressed/decompressed image data is immediately sent to the output buffer 2045. The output buffer 2045 performs handshake with the image bus I/F controller 2041 and image compressor/decompressor 2043 and transfers the compressed or decompressed image data to the image bus I/F controller 2041. The image bus I/F controller 2041 transfers the transferred compressed (or decompressed) image data to the RAM 2002 or respective devices on the image bus 2008. Such series of processes are repeated until all processing requests from the CPU 2001 are processed (until processing for the required number of pages is completed) or until this image compressor/decompressor 2043 outputs a stop request (upon occurrence of an error in a compression or decompression mode or the like).

Figure 7:
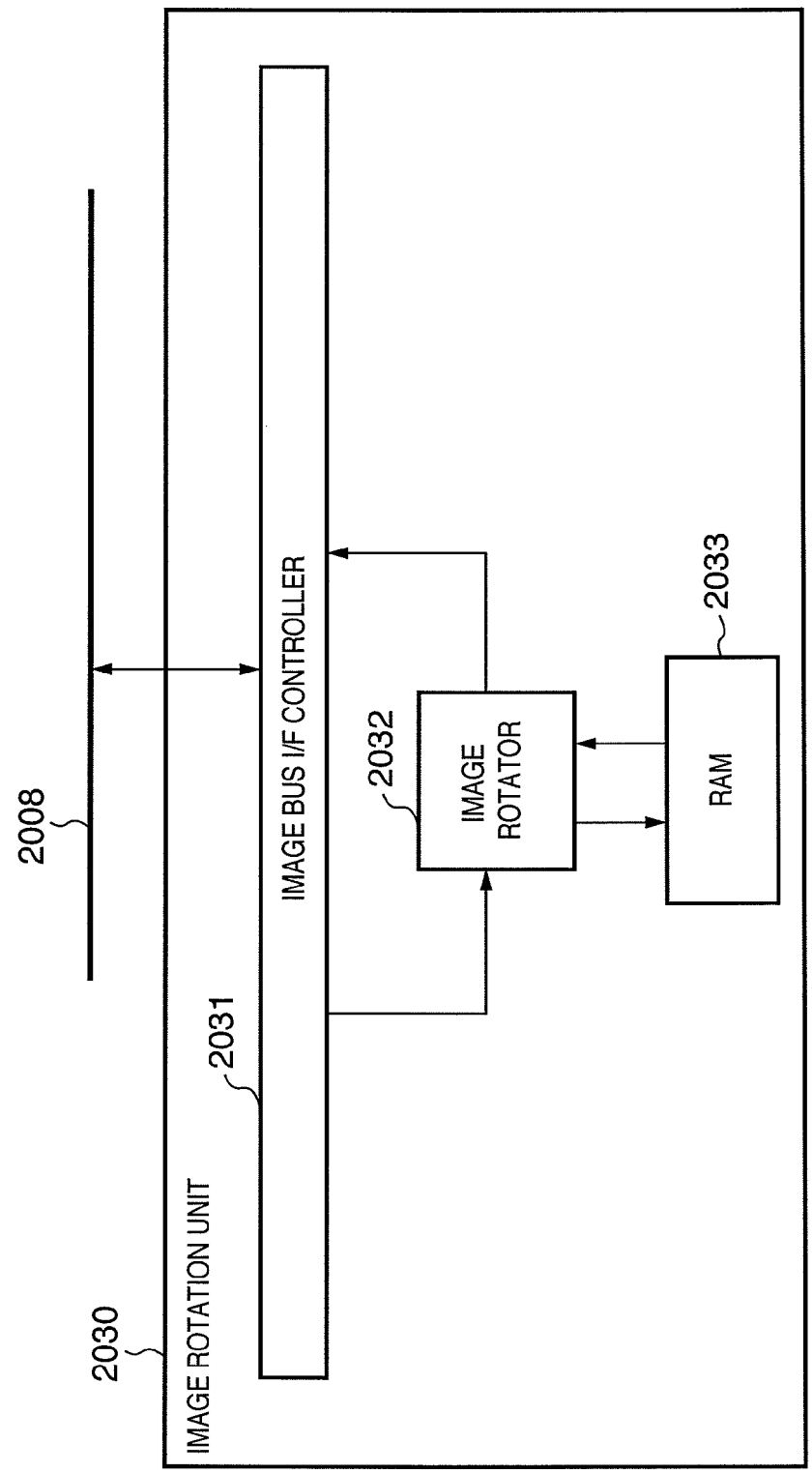
FIG. 7 is a block diagram for explaining the functional arrangement of an image rotation unit of the MFP according to the embodiment of the present invention.

FIG. 7 is a block diagram for explaining the functional arrangement of the image rotation unit 2030 of the MFP according to this embodiment.

An image bus I/F controller 2031 is connected to the image bus 2008 to control its bus access sequence. More specifically, the image bus I/F controller 2031 performs control such as timing control required to exchange data with an image rotator 2032, a mode setting for the image rotator 2032, and the like. A RAM 2033 temporarily stores image data to be rotated. The image rotator 2032 rotates image data according to a designated rotation angle, and outputs the rotated result to the image bus I/F controller 2031.

Figure 8:
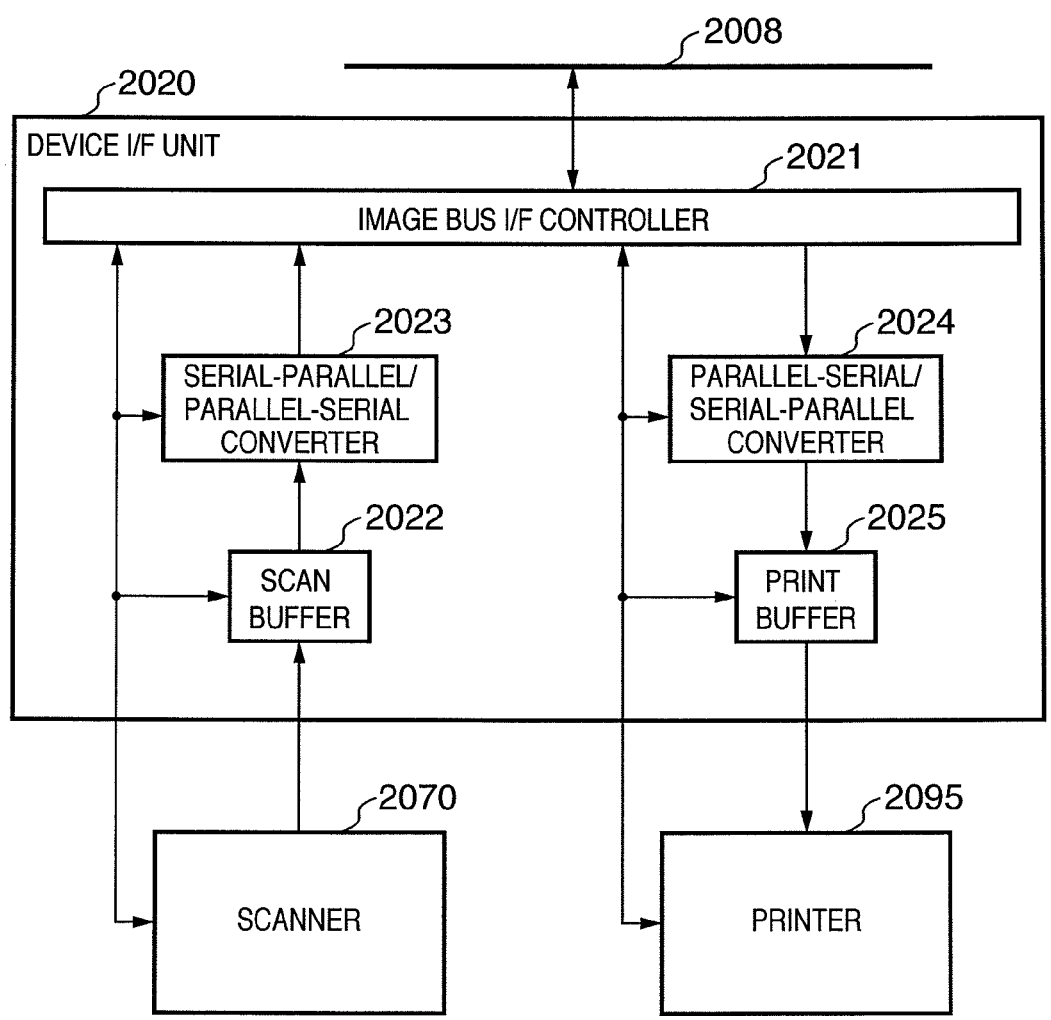
FIG. 8 is a block diagram for explaining the functional arrangement of a device I/F unit of the MFP according to the embodiment of the present invention.

FIG. 8 is a block diagram for explaining the functional arrangement of the device I/F unit 2020 of the MFP according to this embodiment.

An image bus I/F controller 2021 is connected to the image bus 2008 to control its bus access sequence, and to control devices of the scanner image processing unit 2080 and generate timings for these devices. The image bus I/F controller 2021 also generates control signals to the external scanner 2070 and printer 2095. A scan buffer 2022 temporarily saves image data sent from the scanner 2070 and synchronously outputs the image data to the image bus 2008. A serial-parallel/parallel-serial converter 2023 arranges in a given order or decomposes image data saved in the scan buffer 2022 so as to convert it into the data width of image data which can be transferred onto the image bus 2008. A parallel-serial/serial-parallel converter 2024 decomposes or arranges in a given order image data transferred from the image bus 2008 so as to convert it into the data width of image data which can be saved in a print buffer 2025. The print buffer 2025 temporarily saves image data sent from the image bus 2008, and synchronously outputs the image data to the printer 2095.

The processing sequence in an image scan mode will be described below.

Image data sent from the scanner 2070 is saved in the scan buffer 2022 in synchronism with a timing signal sent from the scanner 2070. When the image bus 2008 is a PCI bus, image data for 32 bits is output from the buffer 2022 to the serial-parallel/parallel-serial converter 2023 in a FIFO manner when the scan buffer 2022 stores image data for 32 bits or more. The serial-parallel/parallel-serial converter 2023 converts the input data into 32-bit data, and transfers the converted data onto the image bus 2008 via the image bus I/F controller 2021.

When the image bus 2008 is an IEEE1394 bus, image data in the scan buffer 2022 is sent from the buffer 2022 to the serial-parallel/parallel-serial converter 2023 in a FIFO manner. The serial-parallel/parallel-serial converter 2023 converts the input data into serial image data, and transfers the converted data onto the image bus 2008 via the image bus I/F controller 2021.

The processing sequence in an image print mode will be described below.

When the image bus 2008 is a PCI bus, the image bus I/F controller 2021 receives 32-bit image data sent from the image bus 2008, and sends it to the parallel-serial/serial-parallel converter 2024. The parallel-serial/serial-parallel converter 2024 decomposes the input image data to that of the number of input data bits of the printer 2095, and saves it in the print buffer 2025. When the image bus 2008 is an IEEE1394 bus, the image bus I/F controller 2021 receives serial image data sent from the image bus 2008, and sends it to the parallel-serial/serial-parallel converter 2024. The parallel-serial/serial-parallel converter 2024 converts the received image data into that of the number of input data bits of the printer 2905, and saves it in the print buffer 2025. Then, the image data in the print buffer 2025 is sent to the printer 2095 in a FIFO manner in synchronism with a timing signal sent from the printer 2095.

This MFP comprises the scanner 2070, printer 2095, and FAX (modem) 2050. For this reason, all of scanned/copied image data scanned from a document, print data transmitted from a driver of a host/client, and image data to be transmitted via FAX must be archived without omission. Hence, when these image data are input/output, all image data output onto the image bus 2008 are stored in the HDD 2004. At this time, image data stored for an archive undergoes further image compression processing by the image compression unit 2040 so as to save the storage area of the HDD 2004. Alternatively, image data may be stored in the HDD 2004 after processing such as conversion from a color image into a monochrome image, reduction of an image size, or the like is executed.

Figure 9:
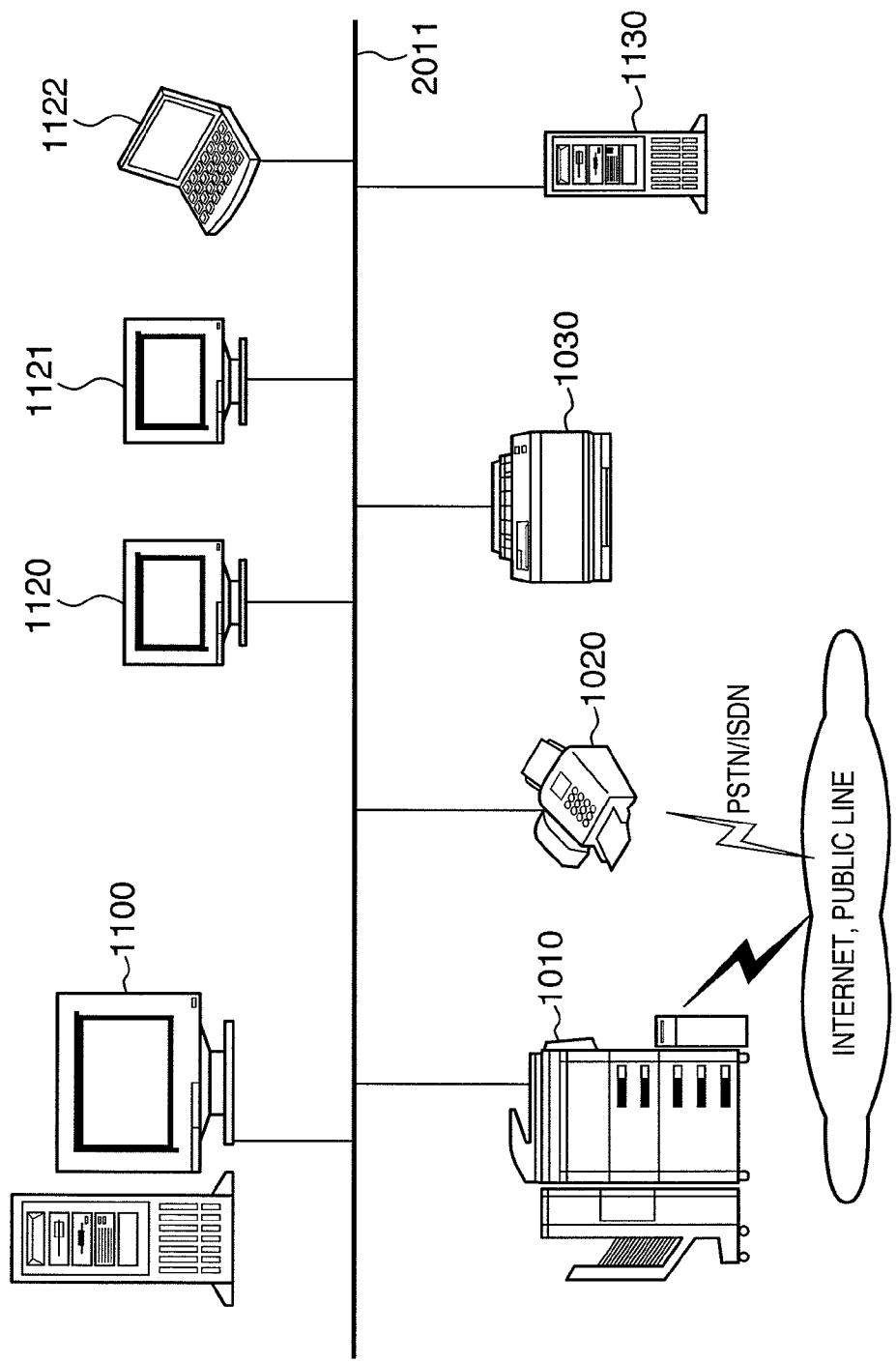
FIG. 9 is a diagram for explaining the overall arrangement of an archive system according to the embodiment of the present invention.

FIG. 9 is a diagram for explaining the overall arrangement of an archive system according to the embodiment of the present invention.

An MFP 1010 comprises the aforementioned archive function, and corresponds to the image outputting apparatus described above. This MFP 1010 has the scanner 2070, printer 2095, FAX 2050, HDD 2004, and the like. For this reason, the MFP 1010 can transmit image data scanned by the scanner 2070 onto the local area network (LAN) 2011, and can print image data received from the LAN 2011 using the printer 2095. The MFP 1010 can transmit image data scanned by the scanner 2070 onto the public line (PSTN) or ISDN 2051 via the modem 2050, or can print an image signal received from the PSTN or ISDN 2051 using the printer 2095. An archive server 1100 collects archive data stored in each archive-function compatible device periodically or as needed. The data which have been collected by the archive server 1100 are deleted from a storage device on the device. Furthermore, this archive server 1100 has a function of transferring collected archive data to a large-capacity storage device and storing them in the storage device, so as to prepare for long-term saving and interpretation at a later date. The archive server 1100 also has a function of extracting character information by applying character recognition processing (OCR) to the collected image data so as to verify whether or not confidential information or inhibition information is included, and searching and collating archive data based on the leaked document data. These functions which form the archive server 1100 may be implemented as a software group physically on one server, or may be distributed and allocated on a plurality of servers on the network.

A FAX (facsimile) device 1020 does not comprise any archive function, and can transmit and receive image signals via the PSTN or ISDN by FAX transmission means. A printer device 1030 does not comprise any archive function, and prints data output from a driver on a host. Both the FAX device 1020 and printer device 1030 comprise network units which are connected to the network 2011 and allow two-way communications.

Reference numerals 1120, 1121, and 1122 denote clients/hosts (PC) as information processing apparatuses used by general users. These PCs are installed with a print driver or FAX driver required to issue a print or FAX transmission instruction to the MFP 1010, FAX device 1020, and printer device 1030, and can utilize these apparatuses via the LAN 2011. A driver distribution server 1130 can install a printer driver or FAX driver in the PCs 1120, 1121, and 1122 via the network in response to an automatic or manual instruction. A Web server runs on the driver distribution server 1130, and can access driver software from the URL assigned to this Web server. Furthermore, this driver distribution server 1130 releases driver software to the public as shared files that can be accessed from the PCs 1120 to 1122.

Figure 10:
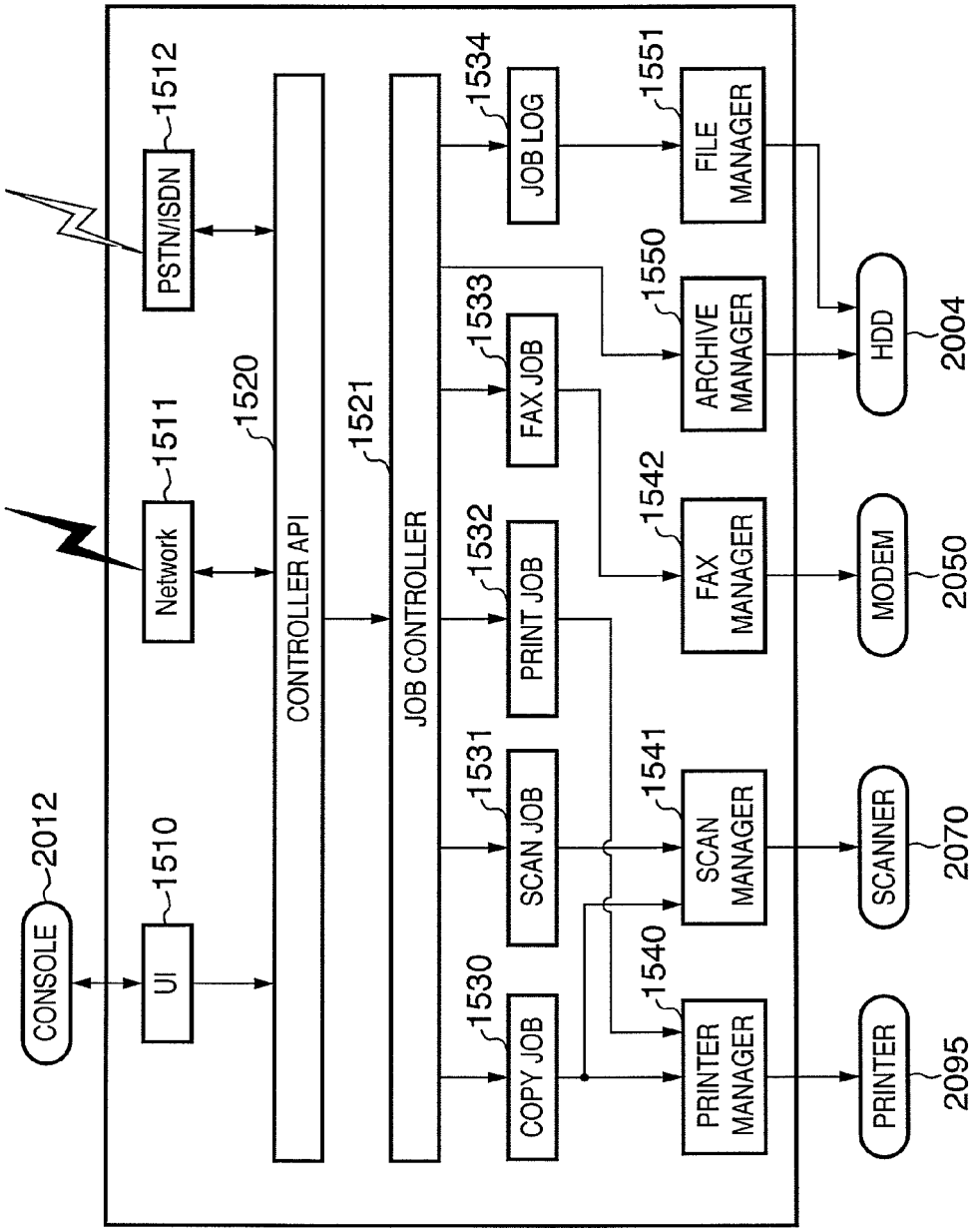
FIG. 10 is a block diagram for explaining the software arrangement of a controller of the MFP according to the embodiment of the present invention.

FIG. 10 is a block diagram for explaining the software arrangement of the control unit 2000 of the MFP 1010 according to the embodiment of the present invention.

A UI module 1510 controls a user interface, and mediates various operations and settings between the operator and the MFP 1010 when the operator makes various operations and settings at the console 2012 of the MFP 1010. This UI module transfers input information to various modules to be described later in accordance with an operation made by the operator at the console 2012 to issue a request of that processing, or to set data. A network module 1511 implements network communications by controlling the network I/F unit 2010. More specifically, the network module 1511 controls hardware of the network I/F unit 2010 and makes software communication control using various communication protocols to exchange communication data input/output via such communications with a controller API 1520. A line module 1512 executes FAX control. That is, the line module 1512 controls the modem 2050, and exchanges data input/output via the line with the controller API 1520.

The controller API 1520 is a control part of a software interface (to be referred to as a soft I/F hereinafter) of the control unit of this MFP 1010. Applications implement operations such as copy, print, scan, FAX, and the like in the MFP 1010 in accordance with the specifications of the soft I/F which are specified by the controller API 1520. Although not shown, the UI module 1510 includes, as such applications, intra-device applications required to implement functions of the apparatus itself such as copy, scan, FAX transmission/reception, and the like. The printer drivers and FAX drivers on the PCs 1120 to 1122 are also applications required to use the functions of the MFP 1010. These drivers generate data including device control information and management information according to the soft I/F specified by the controller API 1520, and transmit the generated data to the MFP 1010 via the network 2011. These data are interpreted by the controller API 1520, and are then converted into device operations. The controller API 1520 handles an operation unit as a job, and information associated with detailed operation settings of such job are set from the application as a job attribute shown in FIG. 12 to be described later.

As a lower layer of this controller API 1520, a job controller 1521, which implements operations in job units corresponding to various functions, exists. These jobs include a copy job 1530, scan job 1531, print job 1532, and FAX job 1533. Furthermore, these job modules cooperate with a printer manager 1540, scan manager 1541, and FAX manager 1542, which control hardware devices used in these jobs. A job log module 1534 saves log information of these operations in job units. A file manager 1551 provides a read/write interface from/to the HDD 2004 to the job log module 1534. An archive manager 1550 archives image data input/output by this MFP 1010, and executes read processing of archive data in response to a request from the archive server 1100.

The operation of the overall archive server according to this embodiment shown in FIG. 9 will be described below. In the following description, assume that archive-function compatible drivers are installed in the PCs 1120 and 1121 of the PCs 1120 to 1122. Also, assume that the archive-function compatible drivers are used to issue print/FAX transmission instructions to the MFP 1010, FAX device 1020, and printer device 1030. Each archive-function compatible driver transmits print data, FAX data, or image data generated based on such data to the archive server 1100 prior to transmission of the print data or FAX data to the MFP 1010 or the like. Data to be transmitted from the archive-function compatible driver to the archive server 1100 may also include information required to specify the user who issued a print or FAX transmission execution instruction. Furthermore, data to be transmitted from the archive-function compatible driver to the archive server 1100 may also include print or FAX setting information. Transmitting the aforementioned data, i.e., the data required to attain tracing later (to be referred to as archive data hereinafter) from the archive-function compatible driver to the archive server 1100 in addition to the device such as the MFP 1010 or the like, which is controlled to execute a print or FAX job by the driver, will be referred to as "archiving" hereinafter. Also, it is assumed that an archive-function incompatible driver is installed in the PC 1122, and is used to issue a print/FAX transmission instruction to the MFP 1010, FAX device 1020, and printer device 1030.

The processing executed when the archive-function compatible driver transmits print/FAX data to a device which does not comprise any archive function (e.g., the FAX device 1020, printer device 1030) will be described below with reference to the flowchart of FIG. 11.

Figure 11:
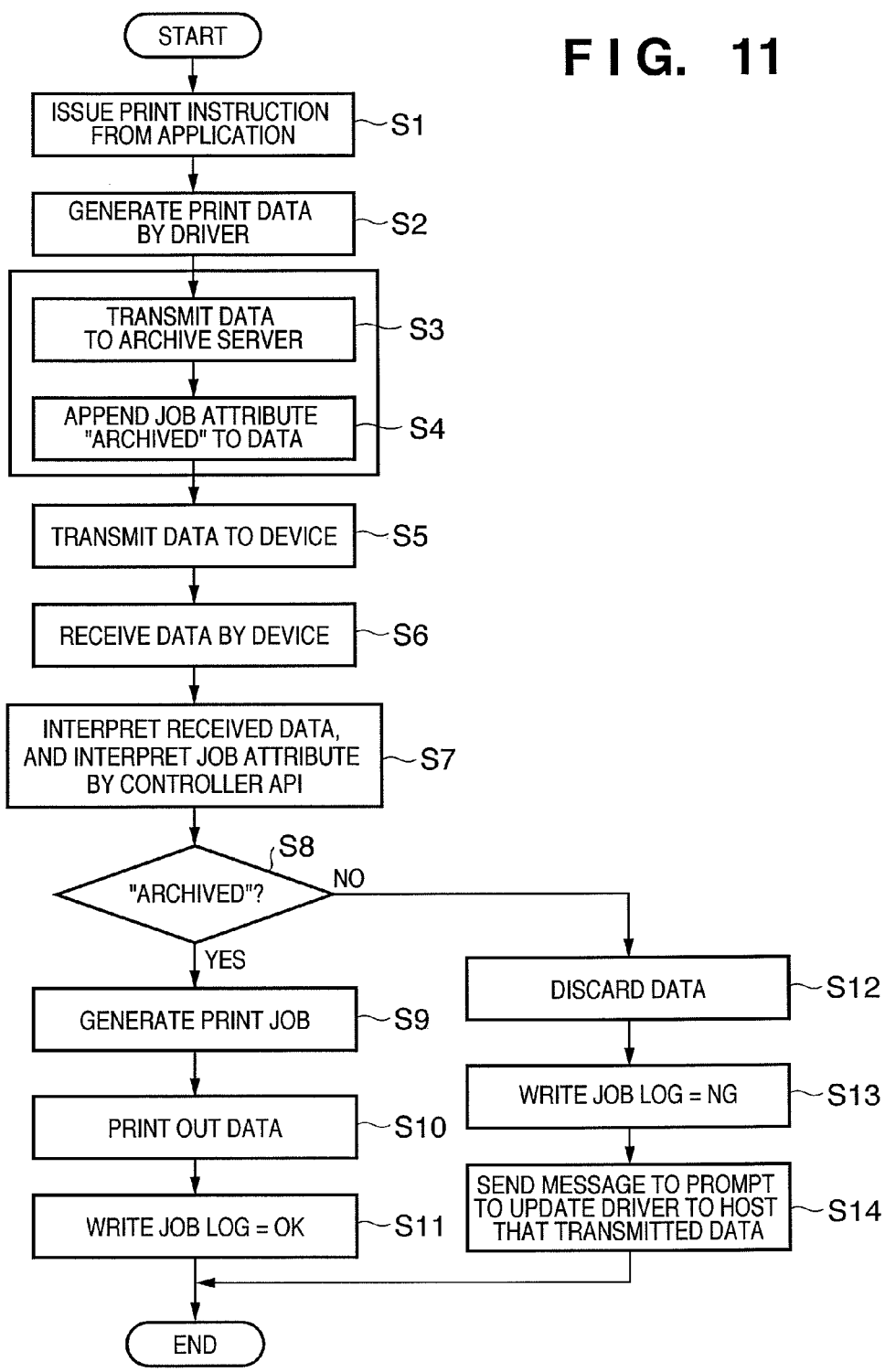
FIG. 11 is a flowchart for explaining the flow of the processing of the overall system when a PC which installs an archive-function compatible driver outputs data to a device without any archive function in the archive system according to the embodiment of the present invention.

FIG. 11 is a flowchart showing the flow of the processing in the archive system according to this embodiment. The flow of the processing of the overall system when data is output from the PC (1120) which is installed with the archive-function compatible driver to the device which does not comprise any archive function will be described below. Note that in the flowchart of FIG. 11 processes in steps S1 to S5 indicate those by the PC, and processes in steps S6 to S14 indicate those by the device (printer device 1030 in this case) that receives the data.

When print processing is to be executed from the archive-function compatible driver, i.e., the PC 1120 using the printer device 1030 as an archive-function incompatible device, the user creates data using an application on the PC 1120 in step S1. The user then issues a print instruction to the printer device 1030, and the flow advances to step S2. Upon reception of output data from the application, the archive-function compatible driver generates soft I/F of the controller API 1520 and PDL data required to generate bitmap data in step S2. In step S3, the archive-function compatible driver transmits the data to the archive server 1100 prior to transmission to the printer device 1030. In step S4, the archive-function compatible driver sets a value indicating "archived" in data which is interpreted as an "archive processing status" job attribute by the controller API 1520 of the generated data. Note that FIG. 12 shows control information which is interpreted as job attributes by the controller API 1520.

Figure 12:
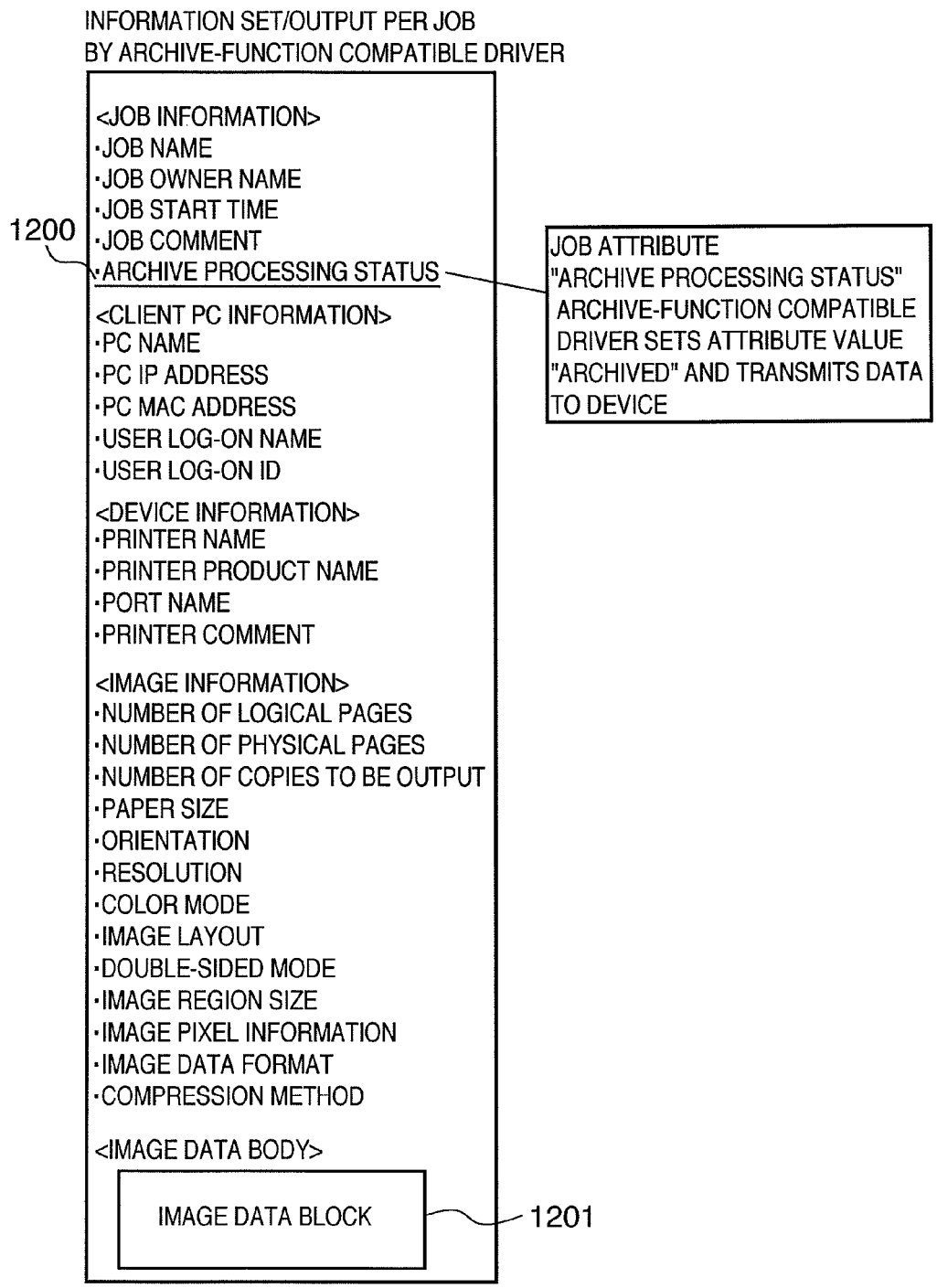
FIG. 12 is a view for explaining the format of print data to be output from a driver of the PC according to the embodiment of the present invention.

FIG. 12 is a view for explaining the format of print data output from the driver of the PC according to this embodiment.

An "archive processing status" job attribute 1200 is one of these pieces of control information, and an image data block 1201 in FIG. 12 corresponds to an image data part as a basis of a bitmap image.

The flow then advances from step S4 to step S5, and the archive-function compatible driver transmits the print data appended with that job attribute to the printer device 1030.

In step S6, the printer device 1030 receives that data, and transfers the received data to its controller API. In step S7, the controller API interprets the data to specify job attributes and setting values set in that data. The controller API checks the setting value of "archive processing status" in step S8. If the value indicating "archived" is set, the flow advances to step S9 to launch the print job and to interpret and process the PDL data. In step S10, an image is printed on a print sheet using a printer engine. Upon completion of the print processing, a job log of end status "OK (normal termination)" is written as a print operation log in step S11, thus ending the processing.

On the other hand, if it is determined in step S8 that no attribute value "archived" is set, the flow advances to step S12 to discard that data without launching any print job. In step S13, since the data is not "archived", a job log of status "NG (archive NG)" indicating that the data is not printed is written. Furthermore, in step S14 the network address of the PC which transmitted that data is specified based on data transmission client information included in the received data in FIG. 12. A message which indicates that the data is not printed, and includes an installation prompt comment including acquisition destination information of an archive-function compatible driver is transmitted to the specified PC 1122, thus ending the processing.

Note that the processes in steps S8 to S14 are also executed when print data is transmitted from an archive-function incompatible driver, i.e., that on the PC 1122, to the printer device 1030 as an archive-function incompatible device.

In FIG. 11, the printer device 1030 processes print job to receive and print the PDL data from the PC 1120. Also, the printer device 1030 processes job other than print job, e.g., job to receive the PDL data from the PC 1120, convert to image data and transmit the image data to the FAX device or the other devices via LAN 2011.

Upon reception of the message transmitted in step S14, the PC 1122 displays a message shown in FIG. 13.

FIG. 13 shows an example of a message to be displayed on a display unit (not shown) of the PC (1122 in this case) according to this embodiment.

This message indicates that data is not printed, and also prompts the user to download an archive-function compatible driver from a URL shown in FIG. 13. Furthermore, assume that the driver distribution server 1130 which can automatically distribute and install this archive-function compatible driver into this PC 1122 is connected to the network 2011. In this case, the printer device 1030 sends information including the network address and user information of the PC 1122 that uses the archive-function incompatible driver to that driver distribution server 1130. Based on this information, the driver distribution server 1130 may automatically install the archive-function compatible driver in the PC 1122.

The message shown in FIG. 13 may describe a URL indicating the storage location of an add-in program module which adds an archive function to the archive-function incompatible driver upon add-in, in place of the URL indicating the storage location of the archive-function compatible driver. Furthermore, the driver distribution server may distribute the add-in program module to the PC 1122 in place of the archive-function compatible driver.

The processing executed when the PC having the archive-function compatible/incompatible driver transmits print or FAX data to the MFP 1010 comprising an archive function according to this embodiment will be described below. The archive function is a function of transmitting image data to be handled by a job of interest, log information generated in association with execution of that job, and the like (these data will be referred to as archive data hereinafter) to the archive server 1100 when the MFP executes various jobs. Executing this function will be referred to as "archiving" hereinafter.

A case will be described below wherein the PC 1120 which is installed with the archive-function compatible driver transmits print data to the MFP 1010 and instructs the MFP 1010 to print it out. In this case, since the processing in the PC 1120 is the same as the processes in steps S1 to S5 in FIG. 11 described above, a description thereof will be omitted. Note that when the PC 1122 installed with the archive-function incompatible driver transmits print data to the MFP 1010, the processes in steps S3 and S4 are skipped.

Figure 14:
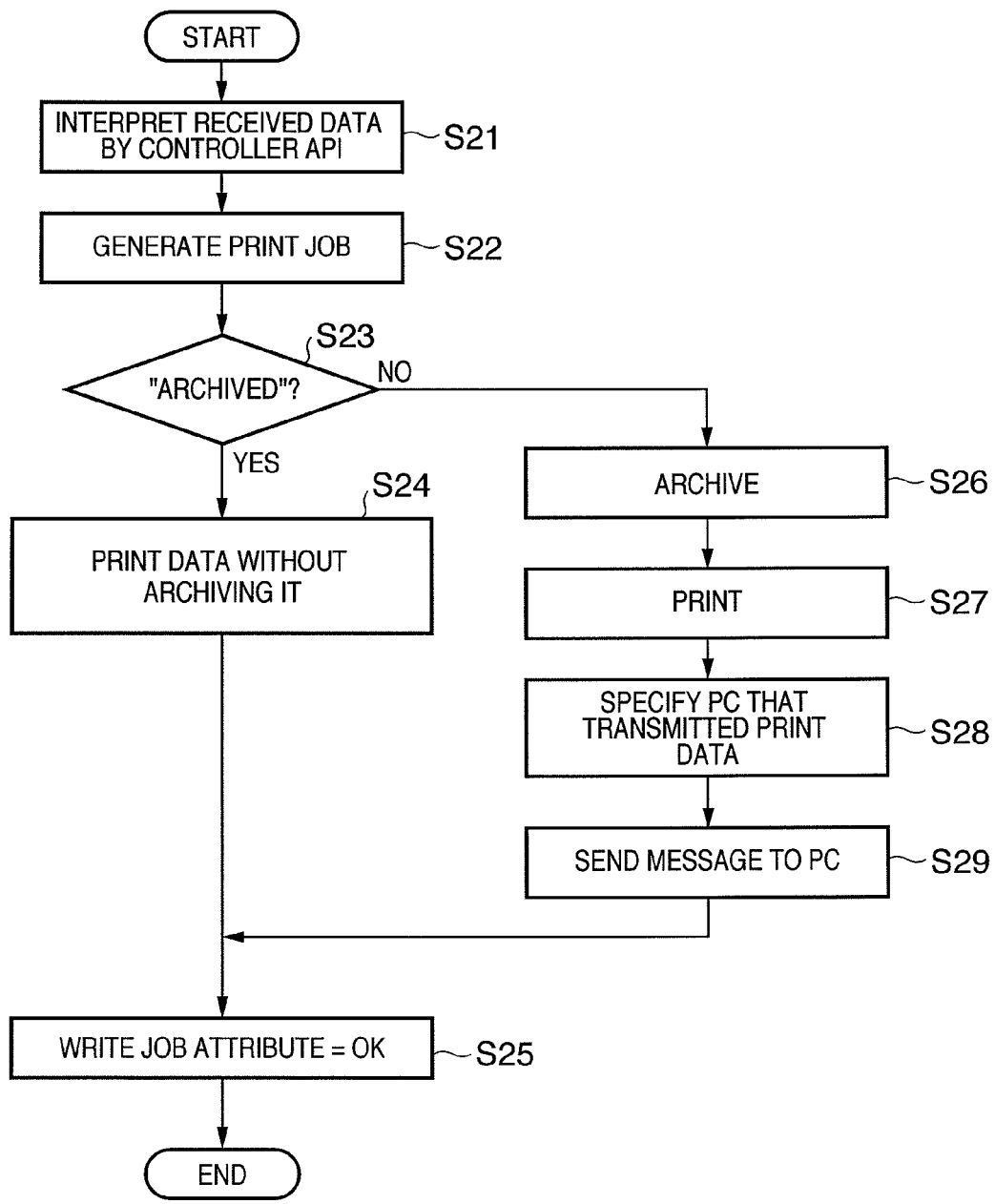
FIG. 14 is a flowchart showing the processing when the MFP according to the embodiment of the present invention receives print data transmitted from the PC.

FIG. 14 is a flowchart showing the processing executed when the MFP 1010 according to this embodiment receives print data transmitted from the PC. A program which implements this processing is stored in the RAM 2002, and is executed under the control of the CPU 2001.

This processing starts upon reception of print data which is sent from the PC and includes PDL data. In step S21, the network unit 1511 transfers the received data to the controller API 1520. The controller API 1520 interprets the print data to specify job attributes and setting values set in that data, thus generating a print job in step S22. In step S23, the controller API 1520 checks the setting value of "archive processing status" 1200 in FIG. 12, which is included in the received data. If the value indicating "archived" is set, the flow advances to step S24. In step S24, the MFP 1010 itself does not execute archive processing of the print data, and launches the print job 1532 to execute interpretation processing of the PDL data and print processing using the printer 2095. Furthermore, upon completion of the print processing, a job log indicating end status "OK (normal termination)" is written as a print operation log in the HDD 2004 via the job log module 1534, thus ending the processing.

On the other hand, if it is determined in step S23 that the value indicating "archived" is not set, i.e., if print data is received from the archive-function incompatible driver, e.g., the PC 1122, the flow advances to step S26. In step S26, since the received print data must be archived, the controller API 1520 launches the archive manager 1550 to archive the data printed by the print job 1532 in the HDD 2004. Parallel to this step, the controller API 1520 launches the print job 1532 to execute the print operation in step S27.

In step S28, the controller API 1520 specifies the network address of the PC 1122 which transmitted that print data, based on data transmission client information included in the received data shown in FIG. 12. In step S29, the controller API 1520 transmits a message which includes an installation prompt comment including acquisition destination information of an archive-function compatible driver to the specified PC 1122. Upon completion of the archive processing and print processing, the controller API 1520 writes a job log including end status "OK (normal termination)" in the HDD 2004 as a print operation log in step S25, thus ending this processing.

Upon reception of the message transmitted in step S28, the PC 1122 displays a message shown in FIG. 15 to prompt the user to download an archive-function compatible driver from a URL shown in FIG. 15.

Assume that the driver distribution server which can automatically distribute and install that driver in the PC is connected to the network 2011. In such case, the controller API 1520 may instruct the server 1130 to transfer the archive-function compatible driver to the PC 1122. More specifically, upon reception of data from the archive-function incompatible driver, the MFP 1010 automatically transmits the network address and user information of the PC 1122 which uses the archive-function incompatible driver to the driver distribution server 1130. Then, the driver distribution server 1130 automatically transmits the archive-function compatible driver to the designated PC 1122 to install the driver in that PC.

The message shown in FIG. 15 may describe a URL indicating the storage location of the aforementioned add-in program module in place of the URL indicating the storage location of the archive-function compatible driver. Furthermore, the driver distribution server may distribute the add-in program module to the PC 1122 in place of the archive-function compatible driver.

Figure 16:
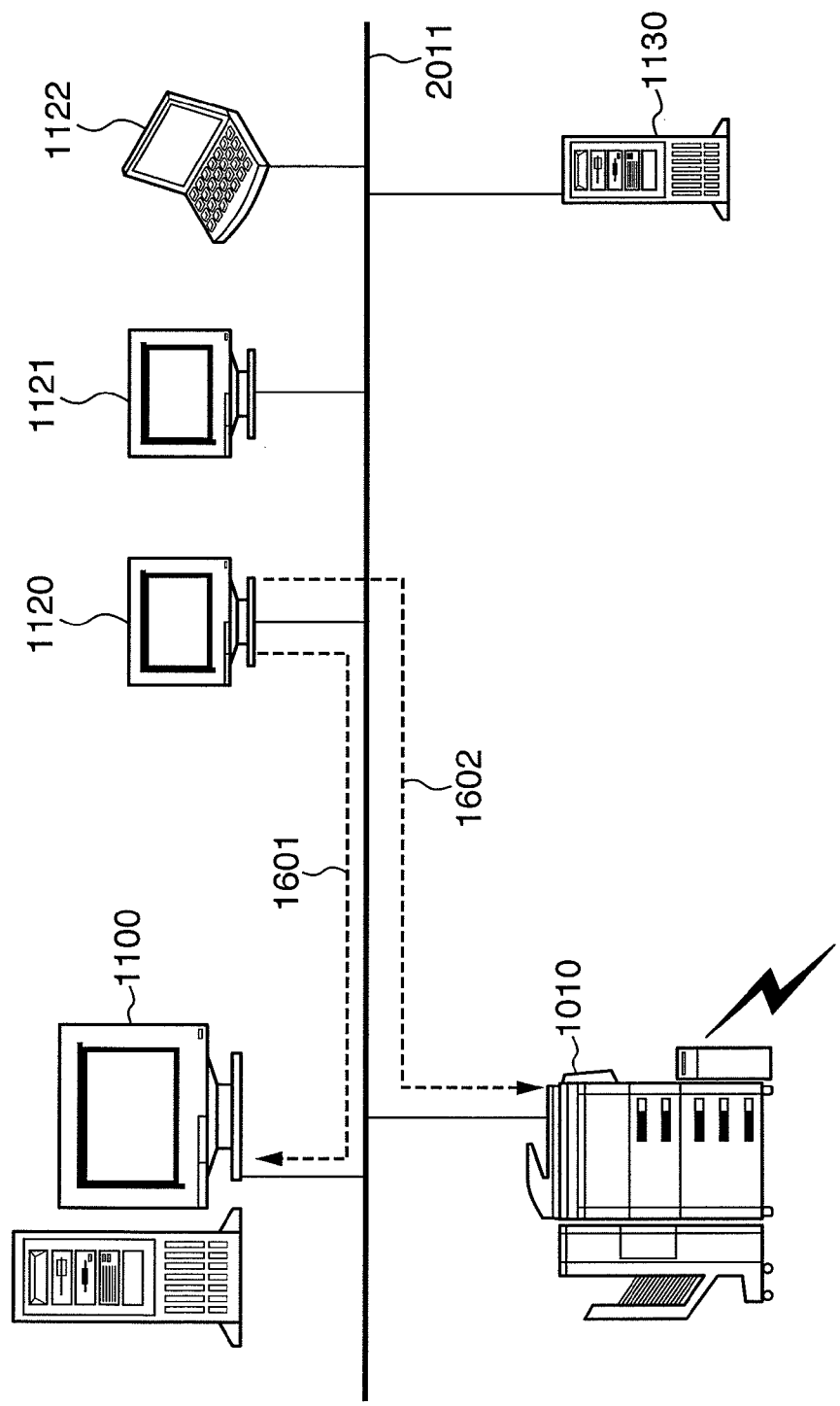
FIG. 16 is a diagram for explaining the flow of the processing when the MFP receives and prints print data from a PC having an archive-function compatible driver according to the embodiment of the present invention.

FIG. 16 is a diagram for explaining the flow of the processing executed when the MFP 1010 receives and prints print data from the PC 1120 which has the archive-function compatible driver according to this embodiment (the same applies to the PC 1121).

Referring to FIG. 16, reference numeral 160 denotes the flow of data in the data archive processing from the PC 1120 to the archive server 1100 in step S3 in FIG. 11. According to the flow shown in FIG. 16, print data transmitted from the PC 1120 to the MFP 101 is archived in the archive server 1100. In this way, "archive processing status" 1200 of the job information shown in FIG. 12 is set to "archived". In this case, since "archived" is set in the job information, the MFP 1010 executes only print processing without archiving that received data.

Figure 17:
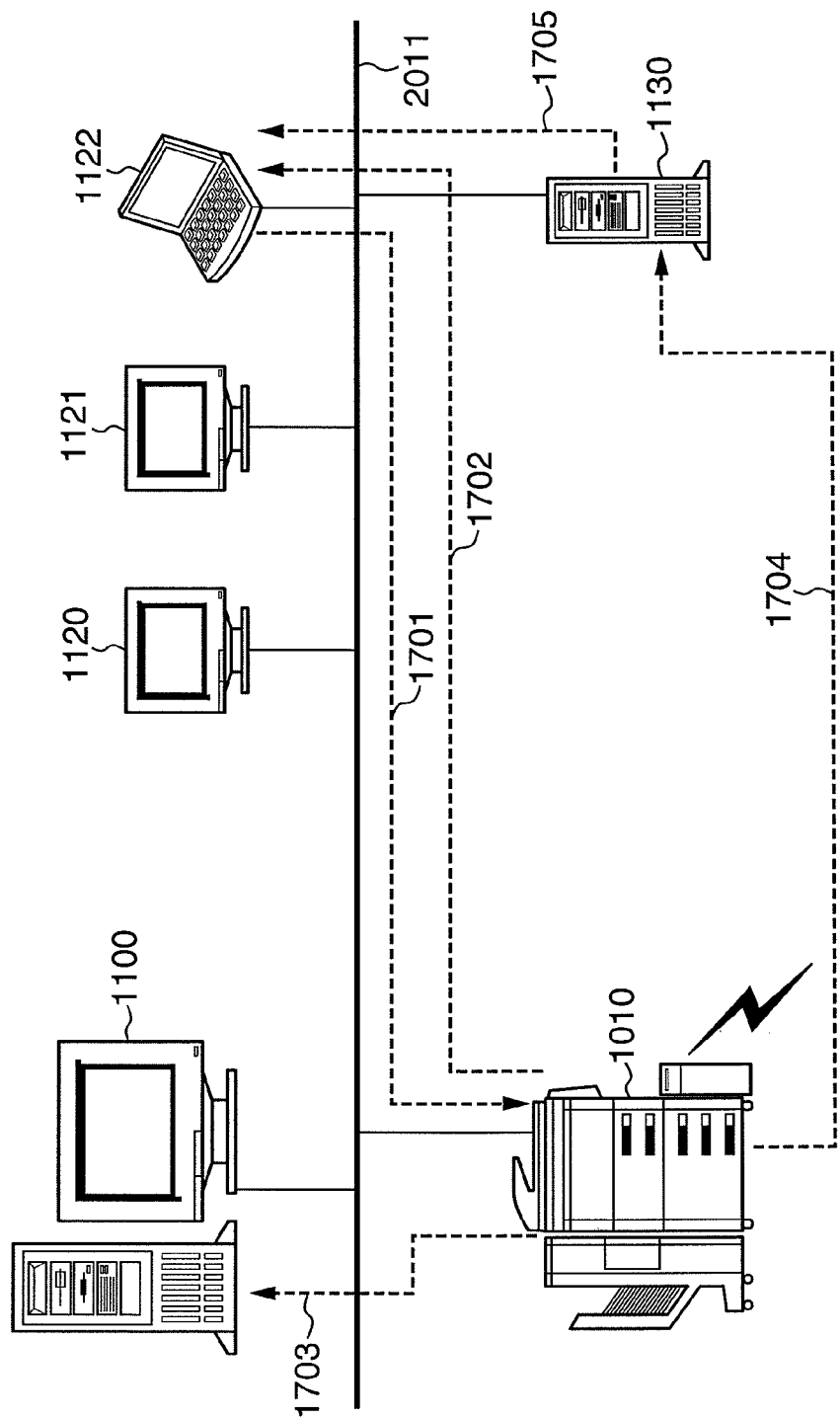
FIG. 17 is a diagram for explaining the flow of the processing when the MFP receives and prints print data from a PC having an archive-function incompatible driver according to the embodiment of the present invention.

FIG. 17 is a diagram for explaining the flow of the processing executed when the MFP 1010 receives and prints print data from the PC 1122 which has the archive-function incompatible driver according to this embodiment.

Reference numeral 1701 denotes the flow of print data from the PC 1122. In this case, since "archived" is not set in the job information, the MFP 1010 archives the received data in the archive server 1100 (1703), and then executes print processing. The MFP 1010 transmits a message which includes an installation prompt comment including acquisition destination information of an archive-function compatible driver to the PC 1122 (1702).

In this case, the driver distribution server 1130 which can automatically distribute and install the archive-function compatible driver to the PC 1122 is connected to the network 2011. For this reason, the MFP 1010 transmits the network address and user information of the PC 1122 to the driver distribution server 1130 to instruct the server 1130 to transfer the archive-function compatible driver to the PC 1122 (1704). In response to this instruction, the driver distribution server 1130 automatically transmits and installs the archive-function compatible driver to the designated PC 1122 (1705).

In the above description, the PC transmits print data to the MFP. Also, the same applies to a case wherein the PC transmits FAX data to the MFP.

As described above, according to this embodiment, archive omission when a device having no archive function is used can be prevented.

An archive system which can prevent double archiving of data when both the driver and device have an archive function, has high efficiency, and can prevent an increase in device down time can be provided.

Furthermore, an archive system which does not compromise user's convenience can be provided.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2005-109220 filed on Apr. 5, 2005, which is hereby incorporated by reference herein in its entirety.

What is claimed is:

1. An image outputting apparatus for outputting an image based on job data received from an external apparatus, comprising:
   a determination unit configured to determine whether or not the received job data has already been transferred to a server by the external apparatus, wherein the server collects job data to be output as an image by the image outputting apparatus and verifies whether or not the collected job data includes confidential information or inhibition information; and
   a control unit configured to, when said determination unit determines that the received job data has already been transferred to the server by the external apparatus, control said image outputting apparatus to output an image based on the received job data, and, when said determination unit determines that the received job data has not been transferred to the server by the external apparatus, transfer the received job data to the server and control said image outputting apparatus to output an image based on the received job data.

2. The apparatus according to claim 1, further comprising a sending unit configured to send a message to the external apparatus that prompts installation of a transferring function for transferring job data to the server, when said determination unit determines that the received data has not been transferred to the server by the external apparatus.

3. The apparatus according to claim 2, wherein said sending unit sends a message including acquisition destination information of software comprising the transferring function.

4. The apparatus according to claim 3, wherein the acquisition destination information of software includes a URL.

5. The apparatus according to claim 3, wherein the acquisition destination information of software includes a path name of a file.

6. The apparatus according to claim 1, further comprising an instruction unit configured to instruct a distribution server terminal, which holds software comprising a transferring function for transferring job data to the server, to transmit the software to the external apparatus by transmitting information required to specify the external apparatus, when said determination unit determines that the received data has not been transferred to the server by the external apparatus.

7. A method of controlling an image outputting apparatus for outputting an image based on job data received from an external apparatus, comprising:
   a determination step of determining whether or not the received job data has already been transferred to a server by the external apparatus, wherein the server collects job data to be output as an image by the image outputting apparatus, and verifies whether or not the collected job data includes confidential information or inhibition information; and
   a control step of, when it is determined in said determination step that the received job data has already been transferred to the server by the external apparatus, controlling the image outputting apparatus to output an image based on the received job data, and, when it is determined in said determination step that the received job data has not been transferred to the server by the external apparatus, transferring the received job data to the server and controlling the image outputting apparatus to output an image based on the received job data.

8. A non-transitory computer-readable storage medium storing a program for causing a computer to implement a method of controlling an outputting apparatus for outputting an image based on job data received from an external apparatus, the method comprising:
   a determination step of determining whether or not the received job data has already been transferred to a server by the external apparatus, wherein the server collects job data to be output as an image by the image outputting apparatus, and verifies whether or not the collected job data includes confidential information or inhibition information; and
   a control step of, when it is determined in said determination step that the received job data has already been transferred to the server by the external apparatus, controlling the image outputting apparatus to output an image based on the received job data, and, when it is determined in said determination step that the received job data has not been transferred to the server by the external apparatus, transferring the received job data to the server and controlling the image outputting apparatus to output an image based on the received job data.

9. An information processing apparatus which can communicate with a server and an image outputting apparatus, wherein the server archives data for outputting an image, the information processing apparatus comprising:
   a first transmitting unit configured to transmit data to be output by the image outputting apparatus to the server;
   a setting unit configured to, when the transmitting unit transmits the data to the server, set information indicating that the data to be output by the image outputting apparatus has been already transmitted to the server in the data;
   a second transmitting unit configured to transmit the data in which the information indicating that the data to be output by the image outputting apparatus has been transmitted to the server is set to the image outputting apparatus.

10. The information processing apparatus according to claim 9, wherein the data transmitted by the second transmitting unit is data to be printed by the image outputting apparatus.

11. The information processing apparatus according to claim 9, wherein the data transmitted by the second transmitting unit is data to be facsimiled by the image outputting apparatus.

12. The information processing apparatus according to claim 9, wherein the data transmitted by the second transmitting unit is data generated by a printer driver in the information processing apparatus.

13. A method of information processing for an information processing apparatus which can communicate with a server and an image outputting apparatus, wherein the server archives data for outputting an image, the method comprising:
   a first transmitting step of transmitting data to be output by the image outputting apparatus to the server;
   a setting step of, when the data is transmitted to the server in the first transmitting step, setting information indicating that the data to be output by the image outputting apparatus has been already transmitted to the server in the data;

a second transmitting step of transmitting the data in which the information indicating that the data to be output by the image outputting apparatus has been transmitted to the server is set to the image outputting apparatus.

14. A non-transitory computer-readable storage medium storing a program for causing a computer to implement a method of information processing for an information processing apparatus which can communicate with a server and an image outputting apparatus, wherein the server archives data for outputting an image, the method comprising:

a first transmitting step of transmitting data to be output by the image outputting apparatus to the server;

a setting step of when the data is transmitted to the server in the first transmitting step, setting information indicating that the data to be output by the image outputting apparatus has been already transmitted to the server in the data;

a second transmitting step of transmitting the data in which the information indicating that the data to be output by the image outputting apparatus has been transmitted to the server is set to the image outputting apparatus.

* * * * *